United States Patent
Sakamoto

[19]

[11] Patent Number: 5,881,326
[45] Date of Patent: Mar. 9, 1999

[54] SHUTTER APPARATUS AND CAMERA APPARATUS

[75] Inventor: Yoshiaki Sakamoto, Tokyo, Japan

[73] Assignee: RIC Company Ltd., Japan

[21] Appl. No.: 923,178

[22] Filed: Sep. 4, 1997

[30]    Foreign Application Priority Data

Dec. 4, 1996   [JP]   Japan .................................. 8-337688
Apr. 30, 1997  [JP]   Japan .................................. 9-124690

[51] Int. Cl.⁶ .............................. G03B 7/08; G03B 15/05
[52] U.S. Cl. ......................... 396/161; 396/162; 396/168; 396/165; 396/235; 396/220; 396/240; 396/242; 396/276
[58] Field of Search ..................................... 396/159, 161, 396/162, 235, 236, 242, 168, 166, 187, 243, 244, 276, 240, 165, 220

[56]    References Cited

U.S. PATENT DOCUMENTS 4,255,030   3/1981  Johnson et al. ......................... 396/187
4,427,276   1/1984  Feinerman et al. ................. 396/244 X Primary Examiner—W. B. Perkey
Attorney, Agent, or Firm—Rossi & Associates

[57]    ABSTRACT

A shutter apparatus is provided wherein openings for defining a secondary aperture are formed in respective shutter blades, such that an amount of light transmitted through the secondary aperture is detected, and the drive force for driving the shutter blades is changed so that the amount of the received amount increases in the opening stroke according to a predetermined function. When the integrated quantity of the received light reaches a threshold value, the movement of the shutter blades is reversed, and the shutter speed is determined based on the integrated light quantity obtained upon completion of shifting to the closing stroke. Thus, variations in the exposure amount that occur upon reversal of the shutter blades are canceled in the closing stroke.

11 Claims, 8 Drawing Sheets

SHUTTER APPARATUS AND CAMERA APPARATUS

BACKGROUND OF THE INVENTION

1. Field of the Invention

The present invention relates to a shutter apparatus wherein the size or area of a secondary aperture for exposure control changes with the size or area of a primary aperture for exposure photographing, so that the operation of a shutter mechanism is controlled based on an amount of light received through the secondary aperture, and also relates to a camera apparatus adapted to automatically fire a strobe in association with the operation of the shutter apparatus.

2. Description of the Prior art

An example of shutter apparatus wherein the size of an secondary aperture through which light is incident upon a photoresponsive element changes with the size of a primary aperture that admits light to a photosensitive film for exposure thereof is disclosed in Japanese Patent Publication No. 57-10406.

In this shutter apparatus, the exposure amount through the primary aperture is controlled referring to the amount of light received by the photoresponsive element through the secondary aperture. A drive device comprising an electromagnetic actuator and a return spring is adapted to drive a pair of shutter blades for reciprocative movement of these blades. Each of the shutter blades is formed with a pair of openings one of which defines a primary aperture and the other defines a secondary aperture. With the reciprocative movement of the shutter blades, overlapping portions of the openings for the primary aperture forms an exposure opening, and overlapping portions of the openings for the secondary aperture form a detection opening.

During an opening process of the shutter blades, the amount of light received through the secondary aperture is integrated, and if the obtained integral value reaches a predetermined threshold value, the electromagnetic actuator reverses the moving direction of the shutter blades, so as to provide a short closing process in which the exposure aperture is closed or eliminated at the maximum speed.

Examples of camera apparatus for taking pictures wherein an electronic flash (strobe) is automatically fired in association with the operation of the above type of shutter apparatus are disclosed in Japanese Patent Application Laid-open Nos. 52-124332 and 52-139419 and Japanese Patent Publication Nos. 60-60046 and 3-608. In these examples, when pictures are taken at night with no ambient light or an insufficient level of the ambient light, or when pictures are taken with back light where the ambient light is at a sufficient level but a main subject is relatively dark compared to its background, the total exposure amount of the film is automatically controlled by adding an amount of exposure of the film to the reflected strobe light to an amount of exposure of the film to the ambient light.

In the camera apparatus disclosed in Japanese Patent Application Laid-open Nos. 52-124332 and 52-139419, the strobe is fired at the same time that the shutter is reversed when the integral value of the output of the photoresponsive element reaches the first threshold value in the opening stroke of the shutter apparatus. After the firing of the strobe, if the integral value reaches the second threshold value that is higher than the first threshold value, the strobe light is quenched.

In another camera apparatus disclosed in the above-identified publications, when the integral value reaches the first threshold value, the strobe is fired for a period of time that is proportional to the period from the start of the exposure to the time when the integral value reaches the first threshold value. If the ambient light is at a low level and the integral value does not reach the first threshold value, the shutter is forced to be reversed at a predetermined limit time, and the strobe is fired at the same time to keep emitting strobe light for a predetermined period of time.

In the camera apparatus shown in Japanese Patent Publication No. 60-60046, the strobe is fired the moment that the exposure opening having a size corresponding to the camera-to-subject distance is formed in the opening stroke of the shutter. Then, the output of the photoresponsive element except that generated during the strobe firing period is integrated, and, when the integral value reaches the threshold value, the shutter is reversed and the exposure opening is closed.

In the camera apparatus shown in Japanese Patent Publication No. 3-608, the strobe is fired if the integral value of the output of the photoresponsive element reaches the first threshold value, and the shutter is reversed if the integral value reaches the second threshold value higher than the first threshold value after the strobe is fired. Then, the strobe light is quenched if the integral value reaches the third threshold value higher than the second threshold value.

In the conventional shutter apparatus, after the electromagnetic actuator starts driving the shutter in the closing direction while the shutter is being biased by the return spring and moved in the opening direction, a little delay time arises until the inertia of the shutter in the opening direction is canceled so that the shutter is completely shifted to the closing stroke. If this delay time varies, the exposure amount of the photosensitive film all over the exposure time varies to a large extent. This is because the exposure opening has its maximum size during exposure at around the time when the shutter is reversed, and a large difference in the exposure amount occurs even with a little difference in the delay time.

Also, the shutter is opened at a constant speed irrespective of the level of the ambient light. If the ambient light is at a high level, therefore, the exposure amount of the film is rapidly increased after the start of the exposure, resulting in a considerably reduced exposure time and a large difference in the exposure amount even with a little difference in the exposure time.

Since the shutter blades are biased or driven with the maximum output of the return spring or electromagnetic actuator, a variation in the frictional force in the shutter mechanism in each exposure operation directly leads to an error in the speed of the shutter blades, resulting in an error in the exposure amount in each exposure operation.

In the shutter apparatus disclosed in Japanese Patent Publication No. 3-5726, on the other hand, the shutter is driven by a step motor, such that the area or size of the exposure opening may be changed according to a desired function, from the start to the end of an exposure operation. In this apparatus, the rate of change in the area of the exposure opening is controlled based on the level of the ambient light measured before the start of the exposure operation, so that the exposure time is controlled to a substantially constant value even if the level of the ambient light varies. Where the ambient light is at a high level, therefore, the exposure opening is slowly opened to the smaller maximum aperture value, and then slowly closed, thus reducing an error in the exposure amount that occurs upon reversal of the shutter.

This shutter apparatus, however, requires an expensive shutter drive mechanism including the step motor and an expensive motor control circuit, and also requires an expensive control circuit which includes a memory for storing the same number of drive programs as that of combinations of the level of the ambient light and other parameters, and a circuit for selecting one of the drive programs. Further, since the motor is exclusively driven irrespective of the actual position of the shutter, errors may arise due to the frictional force of the mechanism, and a high-grade support mechanism or lubricating mechanism will be needed to avoid such errors. These expensive components increase the cost of the shutter apparatus, making the resulting product (camera) only available at a high cost.

SUMMARY OF THE INVENTION

It is therefore an object of the invention to provide a shutter apparatus and a camera apparatus, using relatively inexpensive drive mechanism and control circuit, wherein an error in the exposure amount of the film in each exposure operation can be further reduced.

To accomplish the above object, a shutter apparatus is provided according to the present invention which comprises a shutter mechanism having a primary aperture that defines an exposure opening through which light is incident upon a photosensitive film, and a secondary aperture that defines a detection opening through which the light is incident upon a photoresponsive element, the primary aperture and secondary aperture having opening sizes that vary in association with each other; drive means for driving the shutter mechanism to form an opening stroke in which the size of the exposure opening is increased, and a closing stroke in which the size of the exposure opening is reduced, so as to establish an exposure time in which the photosensitive film is exposed; control means for changing an output condition of the drive means depending upon an output of the photoresponsive element, wherein the control means detects an electric signal corresponding to an instantaneous amount of light received by the photoresponsive element, at least once during the exposure time, so as to control the output condition of the drive means according to the detected electric signal, so that the instantaneous amount of light received by the photoresponsive element is changed along a curve corresponding to a predetermined function.

In the shutter apparatus of the present invention, the drive force for driving the shutter mechanism is adjusted during the exposure time, using a feedback system consisting of the photoresponsive element, control means, drive means, and shutter mechanism. Thus, the quantity of light radiated from a scene illuminated by the ambient light and incident upon the photoresponsive element through the secondary aperture is changed along a curve that is made close to a predetermined function curve representing the relationship between the time and the quantity of the light. This feedback control is performed once or several time or continuously in at least one of the opening stroke and closing stroke of the shutter mechanism.

When the continuous feedback control is performed throughout the opening stroke of the shutter mechanism, the quantity of light incident upon the photoresponsive element changes at a constant rate with respect to time, even if the level of the ambient light varies. Namely, when the ambient light is at a high level, the lower shutter speed and the smaller maximum size of the exposure aperture are automatically selected, and, when the ambient light is at a low level, the higher shutter speed and the larger maximum size of the exposure aperture are automatically selected, resulting in a reduced difference in the exposure time due to a difference in the level of the ambient light.

Where the output signal of the photoresponsive element is compared with a reference signal for control on an analog circuit, a change in the quantity of the received light is instantly reflected by the output condition of the drive means even if an inexpensive, simple circuit is used. Thus, the response of the quantity of the received light to the control can be increased, and the output signal is immediately and stably controlled to the reference signal. Namely, the exposure operation can be stably controlled at a high speed with high response.

Where continuous feedback control is performed throughout at least one of the opening stroke and closing stroke of the shutter mechanism, the quantity of light is continuously controlled by adjusting the output condition of the drive means, whereby an error between the predetermined function and the actual change in the quantity of the received light is reduced compared to the case where the adjustment of the output of the drive means is conducted only once or twice.

Where the shutter speed is adjusted once, or several times, or continuously, in the closing stroke, based on the integral value of the quantity of light received by the photoresponsive element, and the integral value obtained upon completion of the closing stroke, namely, the quantity of the received light all over the entire exposure time, is controlled to be close to a target value, the drive force of the shutter mechanism is automatically increased when the integral value is expected to be excessive, and the drive force of the shutter mechanism is automatically reduced when the integral value is expected to be insufficient. Thus, an error in the exposure amount of the photosensitive film which arises up to the point when the drive force is adjusted is canceled after the adjustment, whereby substantially the same exposure amount of the photosensitive film can be achieved in each exposure operation.

Preferably, at a point of time after shifting to the closing stroke, other than the transition period in which the maximum opening appears or the shutter is reversed, the shutter speed to be employed in the rest of the exposure cycle is determined based on the integral value from the start of the exposure to the above point of time. If the integral value up to the point of time is excessive, the higher shutter speed is selected to reduce the quantity of the received light in the rest of the exposure cycle, and, if the integral value is insufficient up to the point of time, the lower shutter speed is selected to increase the quantity of the received light in the rest of the cycle.

When the drive force of the shutter mechanism is immediately controlled according to the varying quantity of the received light, so that the curve of changes of the quantity of the received light during the exposure time conforms to a curve of a selected function, the integral value during the actual exposure time may vary due to the friction of the shutter mechanism or variations in the drive force, even if the selected function indicates coincidence of the integral value during the exposure time with the required quantity of received light. It is therefore desirable to detect the integral value at a certain point of time in the closing stroke, and adjusts the function to be used in the rest of the exposure cycle, depending upon whether the integral value is expected to be excessive or insufficient.

Where the shutter speed is continuously controlled in the closing stroke that is free from instability due to the reversal of the shutter mechanism, using a given function providing a reference signal, the integral value of the amount of the received light over the entire exposure time can be more accurately controlled, as compared with the case where the shutter drive force is set only once upon reversal of the shutter mechanism.

Where the shutter drive force is determined based on the level of the ambient light in the opening stroke, and the shutter is reversed upon a lapse of a predetermined time from the start of the exposure, for example, the exposure amount may depart from the selected reference in the same manner during the exposure time due to variations in the friction and drive force of the shutter mechanism. It is thus desirable to detect the integral value at a certain point of time in the closing stroke, and adjust the function to be used in the rest of the exposure cycle depending upon whether the integral value is expected to be excessive or insufficient.

In this case, the shutter drive force in the opening process is determined so that a difference in the level of the ambient light is not directly reflected by a difference in the exposure time. If the ambient light is at a high level, a small drive force is employed so as to slowly open the primary aperture, and, if the ambient light is at a low level, a large drive force is employed so as to rapidly open the primary aperture.

In setting the shutter drive force in the closing stroke, the total exposure amount over the entire exposure time is controlled to a predetermined value by increasing or reducing the shutter speed. Namely, if the integral value of the amount of the received light is too small, the smaller drive force than before is employed so as to slowly close the primary aperture, and, if the integral value of the amount of the received light is too large, the larger drive force is employed so as to rapidly close the primary aperture.

Where the drive means, such as an electromagnetic actuator or dc motor, is alternately driven in the positive and negative directions, so that a difference between the positive and negative drive forces is taken out as a drive force in one direction, a significantly larger power can be put into the drive means, as compared with the power required to cause the same drive condition in one direction, so as to achieve relative slow motion with a large tolerance in the drive force and a wide range of its adjustment. The large tolerance in the drive force and wide range of its adjustment may be used to cancel disturbance of the operation due to the friction in the shutter mechanism and variations in the drive mechanism in a short time. Further, since a drive force that is far larger than the level of variations in the drive force and friction force can be generated, these variations can be easily canceled by employing a suitable feedback system, thereby to accurately adjust or control the shutter mechanism and operation pattern. Moreover, the shutter mechanism is microscopically held in a vibrating condition even while it is stopped, whereby the static friction or unexpected attachment of its components does not impede the start of movement of the shutter mechanism.

If the difference of the power in the power pulses in the positive and negative directions is suitably controlled, the drive force for driving the shutter mechanism, the moving speed of the shutter mechanism, and the length of the subsequent exposure time may be increased or decreased as desired. The output condition of the drive means may be controlled by the ratio of the length of power pulses in the positive and negative directions (PWM) or the ratio of the amplitudes of these pulses.

Where the trigger level is changed with respect to the control signal of chopping level, so as to generate the power pulse corresponding to the length by which the inclined portion of the chopping wave exceeds the trigger level, the difference in the positive and negative power can be instantly set by using a simple analog circuit. Further, where the difference between the positive and negative power is kept being controlled by comparing a reference signal and the actual exposure amount that varies constantly, the friction of the shutter mechanism and variations in the drive force can be rapidly canceled each time they occur.

The camera apparatus of the present invention uses the shutter apparatus as described above, and automatically fires a strobe (electronic flash) if the integral value does not reach the threshold value by the time when a predetermined time elapses after the start of the exposure, and it is determined that the level of the ambient light is excessively low.

In the use of the shutter mechanism whose movement is limited at the point the exposure opening is the maximum, if the ambient level is at a low level, the exposure opening is kept at the maximum value for the predetermined time after the start of the exposure, and the strobe is fired.

If the stroboscopic illumination takes place while the exposure opening is at the maximum, the rate of the reflected strobe light interrupted by the primary aperture is reduced, and an increased portion of the reflected light of the strobe illumination can contribute to exposure of the photosensitive film, resulting in an increase in the effective distance of the strobe illumination.

The timing of reversing the shutter mechanism may be determined to a certain proportion (½, for example) of the average exposure time, or may be determined to be a point of time when the integral value of the output signal of the photoresponsive element reaches a certain proportion (½, for example) of the target exposure amount.

In the latter case, the limit time may be set to be lower than the time required to reach a certain proportion of the target exposure amount when the ambient light is at the lowest level that does not require the use of the strobe, and the strobe may be automatically fired at a point of time when the integral value of the output signal of the photoresponsive element reaches the limit time before reaching the target value.

Where auto strobe control is performed using the secondary aperture and photoresponsive element of the shutter mechanism, the total amount of the reflected strobe light contributing the exposure of the photosensitive film can be acquired by the integral value of the reflected strobe light incident upon the photoresponsive element. Namely, even if the size of the exposure opening varies each time the strobe is fired, the exposure amount of the film reaches a sufficiently large value at the point of time when the integral value of the output signal of the photoresponsive element reaches a predetermined value.

When the auto strobe control is performed using the total integral value of the ambient light and reflected strobe light, the amount of the strobe illumination is adjusted until the integral value reaches the second threshold value depending upon the level of the ambient light. If the ambient light is at a high level, the strobe light is quenched in early time so as to avoid excessive exposure, and, if the ambient light is at a low level, the strobe light is quenched in later time so as to avoid insufficient exposure.

Where the auto strobe control is conducted, the exposure amount due to the reflected strobe light may be controlled to an almost constant level, even with different camera-to-subject distances, thereby avoiding excessive exposure at a small camera-to-subject distance or insufficient exposure at a large camera-to-subject distance.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENT

Figure 1:
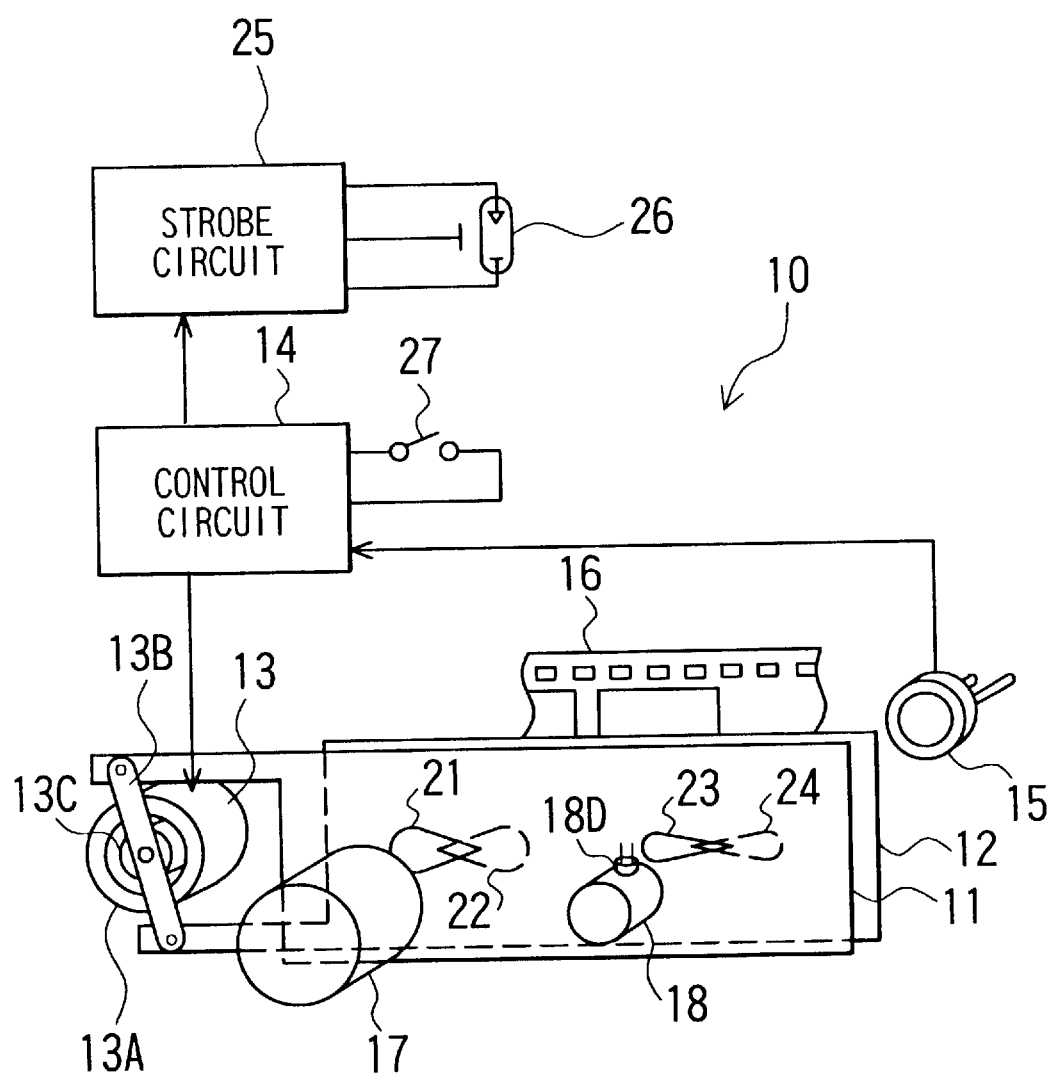
FIG. 1 is a view showing the construction of a camera apparatus of one embodiment of the present invention.
Figure 2:
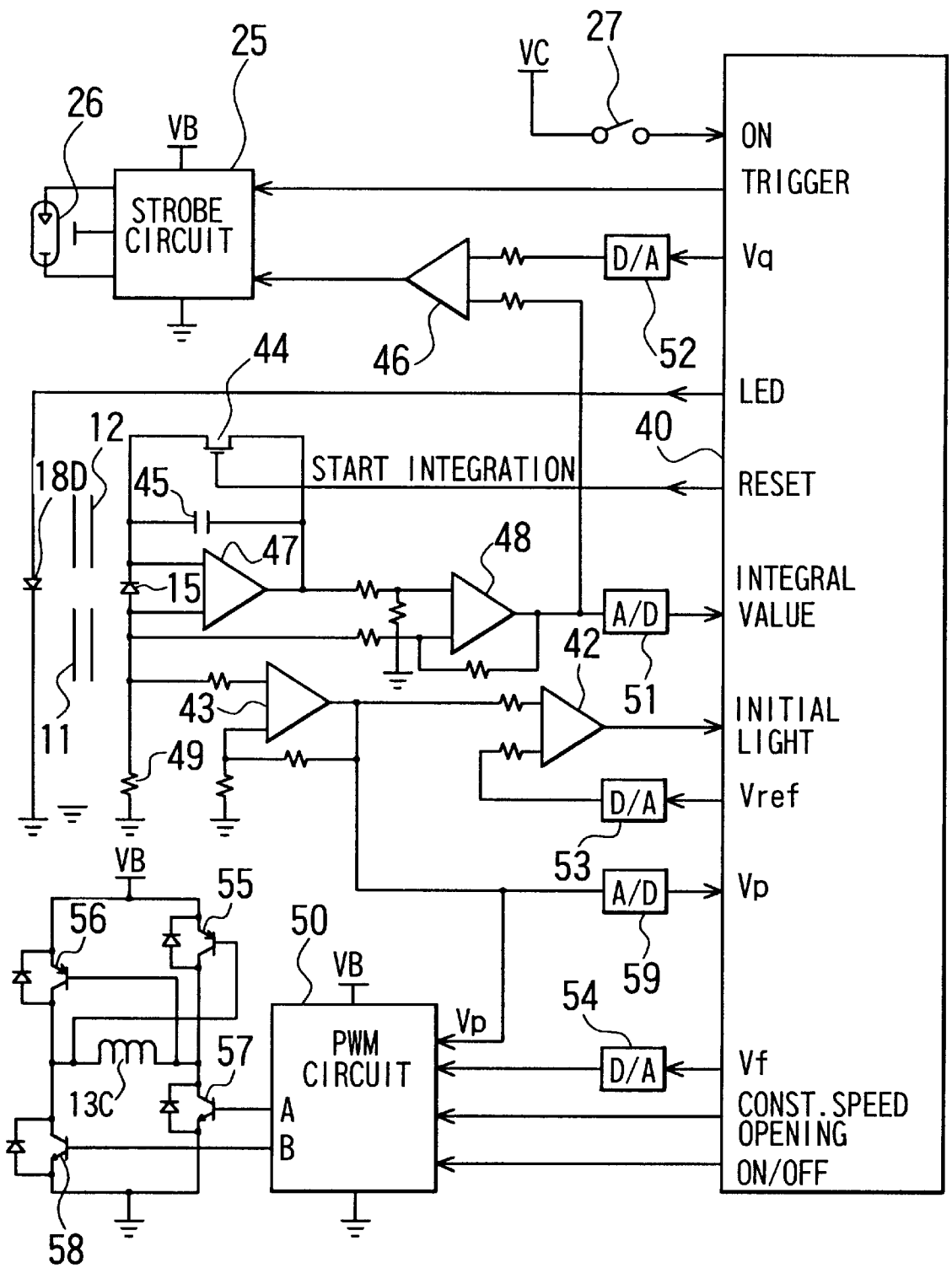
FIG. 2 is a circuit diagram of a control circuit of the camera apparatus of FIG. 1.
Figure 3A:
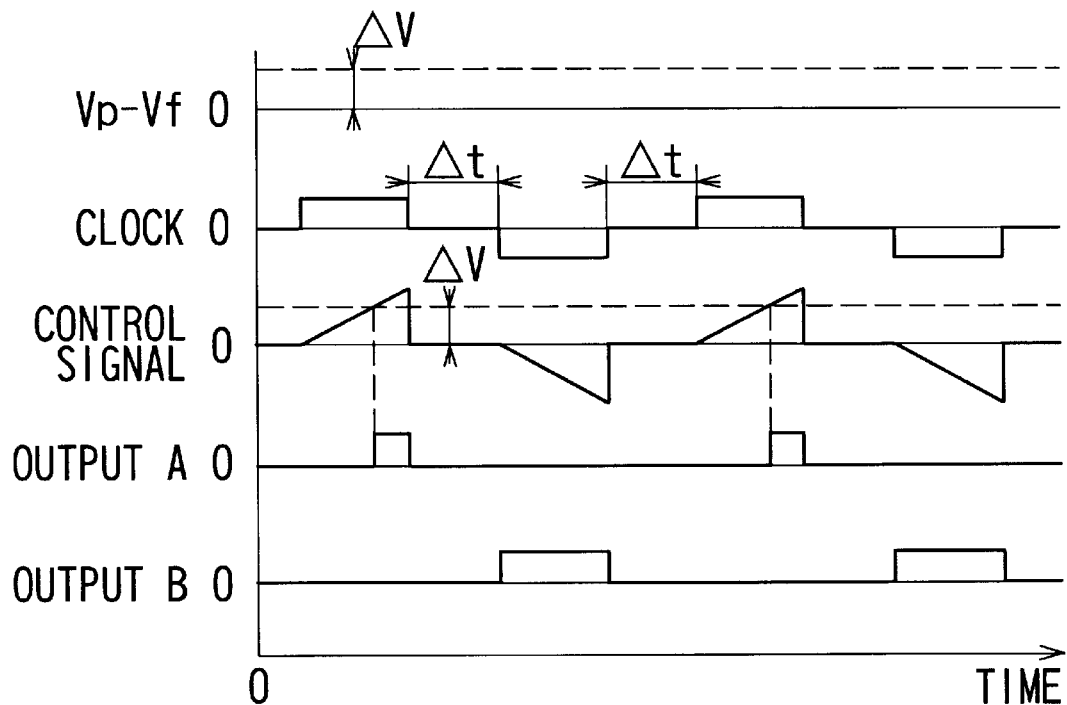
FIGS. 3A and 3B are time charts explaining drive control of an electromagnetic actuator.
Figure 3B:
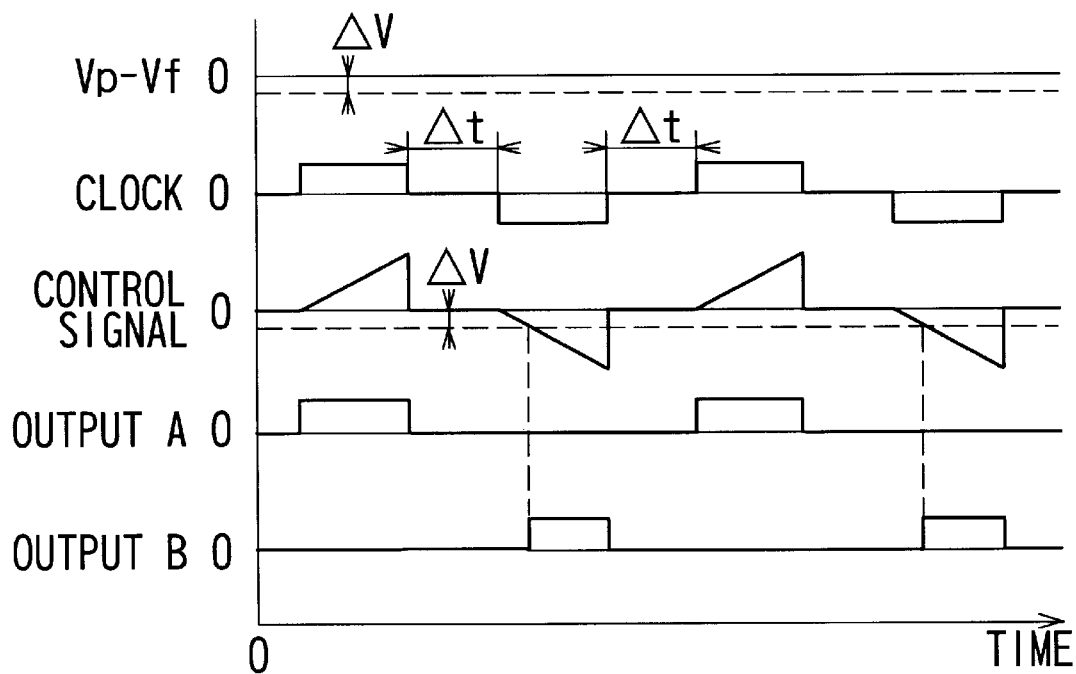
Figure 4:
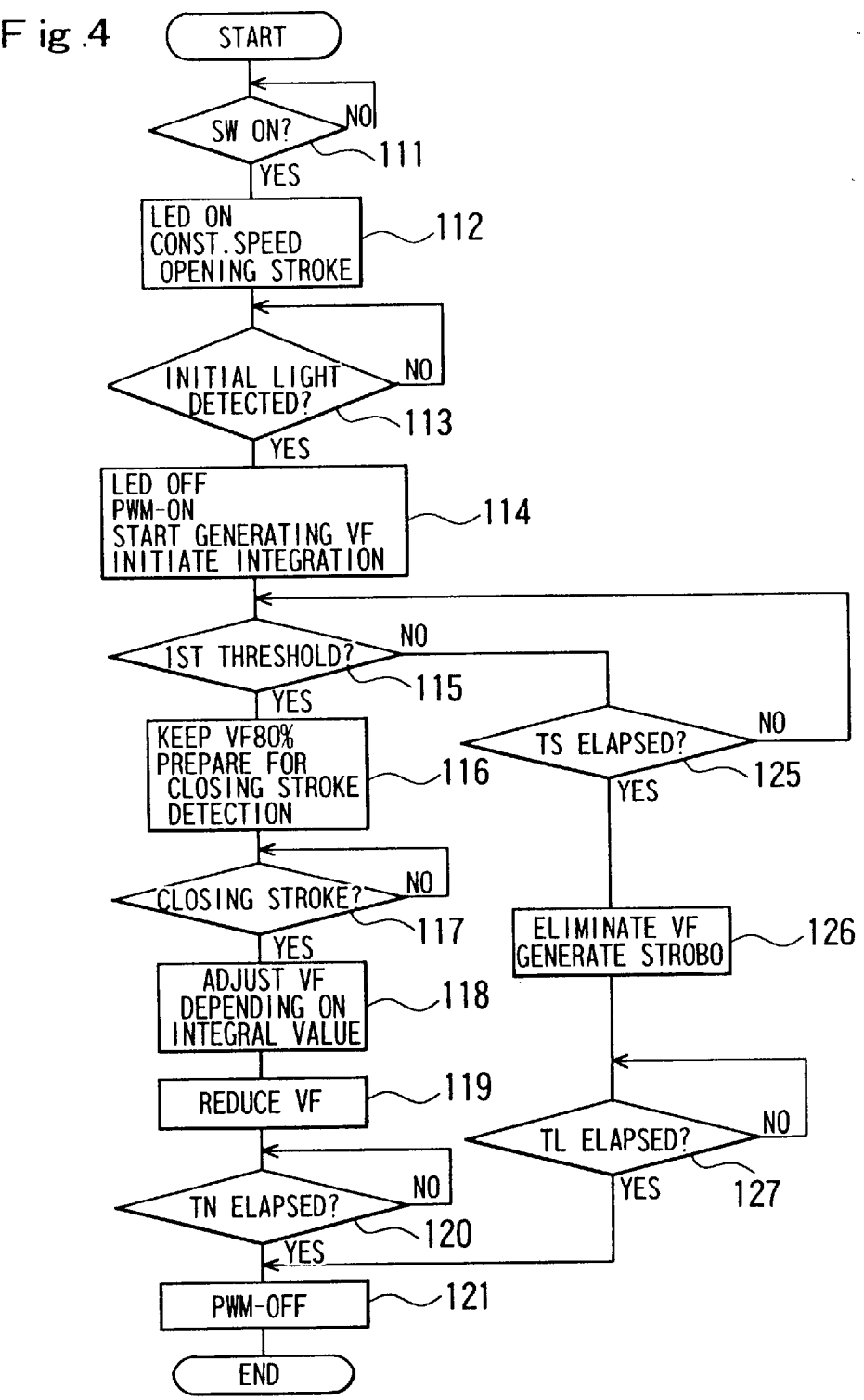
FIG. 4 is a flow chart of exposure control performed by an arithmetic unit.

Referring to FIG. 1 through FIG. 6D, a camera apparatus according to one embodiment of the present invention will be described in detail. FIG. 1 is a view showing the construction of the camera apparatus of the present embodiment, FIG. 2 is a circuit diagram of a control circuit of the camera apparatus, FIGS. 3A and 3B are time charts for explaining the operations of a pulse width modulation circuit, FIG. 4 is a flow chart of exposure control performed by an arithmetic unit, FIGS. 5A–5D are graphs and time chart for explaining control operations performed when the ambient light is at a sufficiently high level, and FIGS. 6A–6D are graphs and time chart for explaining control operations performed when the ambient light is at an insufficient or low level.

As shown in FIG. 1, the camera apparatus 10 of the present embodiment includes a pair of shutter blades 11, 12, electromagnetic actuator 13 adapted to drive the shutter blades 11, 12 for counter movement thereof, control circuit 14 for feeding electric power to the electromagnetic actuator 13, strobe circuit 25 that controls stroboscopic illumination (an electronic flash produced by a discharge tube 26), photoresponsive element 15 used for exposure control, objective lens 17 used for photographing, and a detecting lens used for the exposure control.

The shutter blade 11 is formed with openings 21, 23, and the shutter blade 12 is formed with openings 22, 24, such that the openings 21, 22 cooperate with each other to define a primary aperture, and the openings 23, 24 cooperate with each other to define a secondary aperture. When the shutter blades 11, 12 move relative to each other in the horizontal direction in FIG. 1, an exposure opening is formed at a location where the openings 21, 22 overlap each other, and a detection opening is formed at a location where the openings 22, 24 overlap each other.

The relative movement of the shutter blades 11, 12 is limited by a stopper (not shown) at the position where the exposure opening has the maximum aperture size. Thus, the shutter blades 11, 12 are able to reciprocate between the closed position where the exposure opening is closed, and the limit position where the exposure opening has the maximum aperture size.

Photosensitive film 16 is located behind the primary aperture defined by the openings 21, 22, and the objective lens 17 is located ahead of the primary aperture. Light from a scene illuminated by the ambient light reaches the photosensitive film 16 through the objective lens 17, and focused by the objective lens 17 onto the photosensitive film 16 so as to form an image of the scene including a subject on the film 16.

The photoresponsive element 15 is located behind the secondary aperture defined by the openings 23, 24, and the detection lens 18 is located ahead of this secondary aperture. The area of the detection opening (secondary aperture) changes in accordance with changes in the area of the exposure opening. This detection opening allows the light from a range of the scene to be projected on the photosensitive film 16 by the objective lens 17, to impinge on the photoresponsive element 15 through the detection lens 18. LED (light-emitting diode) 18D provided on the detection lens 18 serves to detect the moment when the secondary aperture begins to open. This LED 18D is turned on while the detection opening is in the initial closed state, and turned off after the initial light is incident upon the photoresponsive element 15 through the detection opening.

The electromagnetic actuator 13 is of a type of ammeter, wherein a coil 13C is rotated in a magnetic field produced by a permanent magnet 13A. In operation, this actuator 13 rotates 45 degrees in positive and negative directions, to reciprocate over an angular range of about 90 degrees in total, so as to generate a drive force corresponding to the level of the power fed to the coil 13C. The shutter blades 11, 12 are driven by the electromagnetic actuator 13 in both opening and closing strokes, through a rotatable beam 13B fixed to the coil 13C. The extreme or limit aperture value of the exposure opening achieved during the exposure time is equal to or less than the maximum opening value, and is automatically determined depending upon the level of the ambient light.

The control circuit 14 starts operating when a switch 27 is closed, so as to start one cycle of exposure control. This circuit 14 also integrates the output of the photoresponsive element 15, so as to estimate the quantity of light (namely, exposure amount) that reaches the photosensitive film 16 through the primary aperture during the exposure time.

The control circuit 14 is adapted to rotate the electromagnetic actuator 13 in the clockwise direction as viewed in FIG. 1 thereby to move the shutter blades 11, 12 in the direction to progressively increase the areas of the apertures, to thus form an opening stroke. When the integrated value of the output of the photosensitive element 15 reaches the first threshold value corresponding to one half of the required exposure light, the output of the electromagnetic actuator 13 is generated in the reverse direction, so as to move the shutter blade 11, 12 in the closing direction to progressively reduce the areas of the apertures, to thus form a closing stroke.

After the shutter blades 11, 12 are shifted to the closing stroke, the control circuit 14 sets or establishes a shutter speed for the rest of the cycle, referring to the integral value of the output of the photoresponsive element 15. In this manner, an error in the exposure amount that occurs upon the reversal of the shutter blades 11, 12 will be canceled by the time when the primary aperture reaches its closed state.

The control circuit 14 determines the level of the ambient light, based on the integrated amount of light received by the photoresponsive element 15 during the exposure time. Where the exposure time is prolonged due to an insufficient level of the ambient light, the strobe circuit 25 is automatically started, to cause the discharge tube 26 to provide stroboscopic illumination. The control circuit 14 then performs so-called auto strobe control, using the integrated value of the output of the photoresponsive element 15, such that the discharge tube 26 is forced to stop discharging thereby to turn off the stroboscopic illumination when the integrated amount of light received by the element 15, which is the sum of the reflected strobe light and the ambient light, reaches a predetermined level.

The control circuit 14 includes an arithmetic unit 40 in the form of a digital circuit, and a pulse width modulation circuit 50 in the form of an analog circuit. The arithmetic unit 40 receives various kinds of input signals, and performs arithmetic operations, so as to establish required output signals according to the flow chart shown in FIG. 4. This arithmetic unit 40 then drives the electromagnetic actuator 13 through the pulse width modulation circuit 50, thereby to control the instantaneous positions of the shutter blades 11, 12 (shutter speed). In this manner, the exposure of the photosensitive film 16 is completed within an almost constant exposure time even if the level of the ambient light varies.

Amplifier 43, which provides an amplifier circuit, amplifies an amount of reduction of the voltage across a resistor 49 due to the current produced by the photoresponsive element 15, so as to form a voltage signal representing an instantaneous amount of the light received by the photoresponsive element 15 through the secondary aperture of the shutter blades 11, 12.

Amplifier 42, which provides a comparator circuit, compares the output of the amplifier 43 with a threshold value Vref established by the arithmetic unit 40 and transmitted through D/A converter 53. Immediately after the exposure operation is started, this comparator circuit detects the initial light of the LED 18 passing through the secondary aperture of the shutter blades 11, 12.

Amplifier 47 and condenser 45 constitute an integrating circuit, and generates a voltage (corresponding the integrated amount of received light) as a result of integration of the current generated by the photoresponsive element 15, while FET 44 is placed in the OFF state. If the FET 44 is turned ON, the opposite ends of the condenser 45 are short-circuited, and the integration output is reset.

Amplifier 48, which provides a differential amplifier circuit (gain 1), generates a net analog integral value obtained by removing an influence of the resistor 49 from the output voltage of the amplifier 47. The analog integral value is converted by A/D converting circuit 51 into a digital value, which is then received by the arithmetic unit 40.

Amplifier 46 provides a comparator circuit relating to the auto strobe control. The output of this amplifier 46 is reversed to generate a quench signal to the strobe circuit 25 when the output signal of the amplifier 48 reaches a threshold value Vq that is generated by the arithmetic unit 40 and converted by D/A converting circuit 52 into an analog voltage.

The pulse width modulation circuit 50 alternately turns ON two pairs of transistors 56, 57 and transistors 55, 58 at a constant frequency (of 50 kHz, for example), through output ports A, B, so as to give power pulses to the coil 13 C in alternate directions. As shown in FIG. 3, the pulse width modulation circuit 50 generates clock signals and control signals in the inside thereof, and biases the coil 13C in the direction to reduce a difference ΔV between a voltage signal Vp corresponding to the amount of the light received, and a lamp voltage Vf set by the arithmetic unit 40.

The interval Δt between adjacent clock signals is set depending upon the L value of the coil 13C, so that after a pulse voltage is dropped, the next pulse voltage is applied in the reverse direction after the induced current produced by the coil 13 disappears. In other words, the L value of the coil 13 is set to a value that is far lower than that of a conventional one, so that clock signals of several dozens of kHz can be used.

The pulse width modulation circuit 50 performs pulse width modulation (PWM) so as to set the ratio of the ON duration in each cycle between the two pairs of the transistors 56, 57 and the transistors 55, 58, and drives the shutter blades 11, 12 in one direction, namely, opening direction or closing direction, by a biasing force corresponding to a difference between the ON durations (duty difference in positive and negative pulses).

Where the voltage signal Vp is greater than the lamp voltage Vf and ΔV takes a positive value, as shown in FIG. 3A, the length of each pulse of the output B is kept at the maximum, and the length of each pulse of the output A is reduced. As a result, a braking force caused by the output A is applied to a biasing force caused by the output B, so that the shutter blades 11, 12 are driven in the closing direction by a biasing force corresponding to a difference between the lengths of the pulses of both of the outputs A, B. The braking force is reduced as ΔV is increased, so that the biasing force that may be increased up to the biasing force of the output B is applied to drive the shutter blades 11, 12 in the closing direction. As a result, the speed of the shutter blades 11, 12 is reduced if they are in the opening stroke, so that the rate of increase in the amount of light received by the photoresponsive element 15 can be reduced. If the shutter blades 11, 12 are in the closing stroke, the speed of the shutter blades 11, 12 is increased so that the rate of reduction in the amount of light received by the photoresponsive element 15 can be increased.

On the other hand, where the voltage signal Vp is smaller than the lamp voltage Vf, and ΔV takes a negative value, as shown in FIG. 3B, the length of each pulse of the output A is kept at the maximum, and the length of each pulse of the output B is reduced. The larger the absolute value of ΔV, the larger the biasing force applied to the shutter blade 11, 12 in the opening direction. As a result, the speed of the shutter blades 11, 12 is increased if they are in the opening stroke so that the rate of increase of the amount of light received by the photoresponsive element 15 is increased. In the closing stroke, on the other hand, the speed of the shutter blades 11, 12 is reduced so that the rate of reduction in the amount of light received by the photoresponsive element 15 is lowered.

As shown in FIG. 2, the arithmetic unit 40 generates the lamp voltage Vf which changes according to a given function as time elapses after the exposure operation is initiated. The lamp voltage Vf in the form of a varying digital signal is converted by the D/A converting circuit 54 into an analog voltage.

The pulse width modulation circuit 50 is adapted to change the amount of light received by the photoresponsive element 15 in accordance with changes in the lamp voltage Vf. Accordingly, the arithmetic unit 40 is able to establish a desired pattern of changes of the amount of light received by the photoresponsive element 15 in the opening stroke and closing stroke, by setting the instantaneous lamp voltage Vf during the exposure time.

Figure 5A:
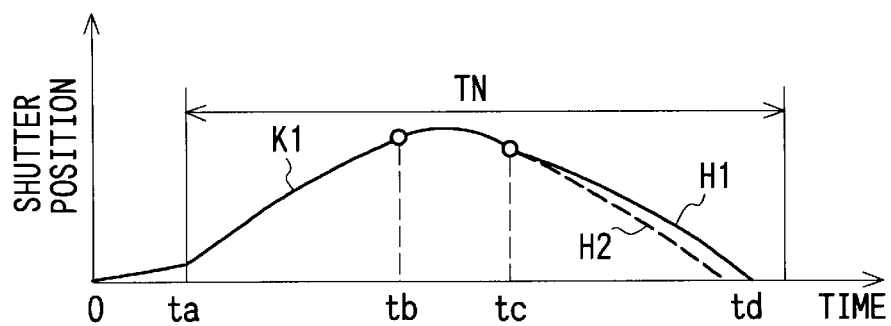
FIGS. 5A–5D are graphs and time chart for explaining exposure control at a sufficient level of ambient light.
Figure 5B:
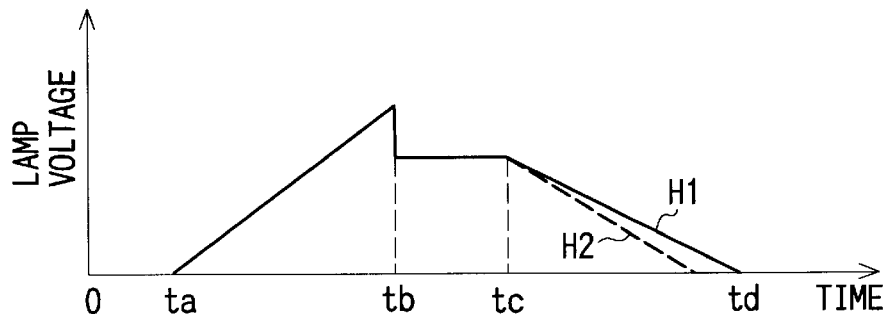

According to the control flow shown in the flow chart of FIG. 4, the arithmetic unit 40 forms the opening stroke K1 and closing stroke K2 of the shutter blades 11, 12 as shown in FIG. 5A, so as to establish the exposure duration or time in which the photosensitive film 16 is exposed. In this operation, the arithmetic unit 40 controls the instantaneous moving speed of the shutter blades 11, 12 by changing the lamp voltage Vf as shown in FIG. 5B. The arithmetic unit 40 then integrates the amount of the received light as shown in the hatched portion in FIG. 5C, so as to adjust the slope of the lamp voltage Vf after the closing stroke is started, according to the integrated value of the amount of the received light.

In step 111 of FIG. 4, one cycle of the exposure control is started upon detection of the operation to turn ON the switch 27. Step 112 is then executed to turn on the LED 18D so as to prepare for detection of the initial light through the secondary aperture. Also, a constant-speed opening stroke is set in the pulse width modulation circuit 50, so as to start the shutter blades 11, 12 at a low speed in the opening direction. The low speed is determined so that the amount of light received by the photoresponsive element 15 is not rapidly increased even when the ambient light is at a high level.

Figure 5C:
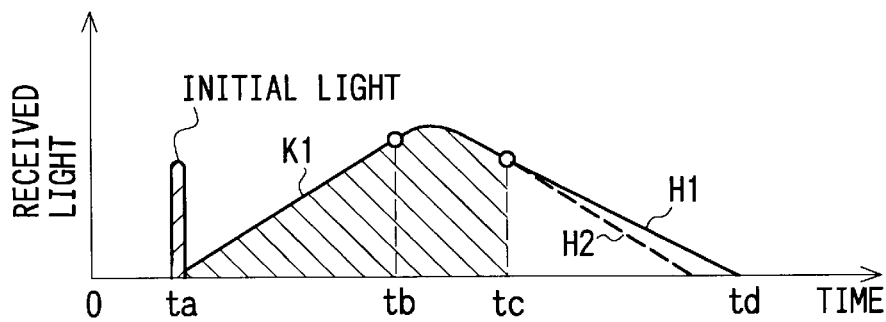

When the light of the LED 18D is incident upon the photoresponsive element 15 through the secondary aperture at a point of time "ta" after the start of the counter movement of the shutter blades 11, 12 at the low speed, the output signal of the photoresponsive element 15 is raised as shown in FIG. 5C, and the initial light is detected by the comparator of the amplifier 42.

Figure 5D:
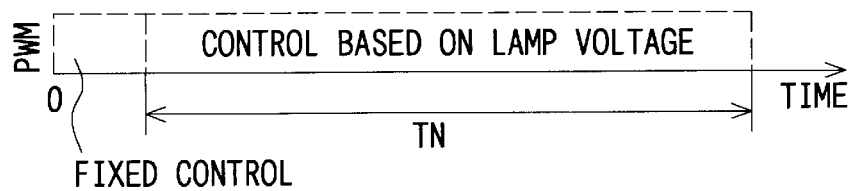

If the initial light is detected in step 113, the control using the lamp voltage Vf is initiated as shown in FIG. 5D. More specifically, in step 114, the LED 18D is turned OFF, and the arithmetic unit 40 cancels the constant-speed opening stroke, and starts operating the pulse width modulation circuit 50 in the feedback control (PWM-ON) mode while starting generating the lamp voltage Vf. The lamp voltage Vf is linearly increased with a constant slope irrespective of the level of the ambient light. The arithmetic unit 40 then turns OFF the FET 44 so as to cause the amplifier 47 and condenser 45 to initiate integration of the amount of the received light.

Step 115 detects whether the output (integral value) of the amplifier 47 reaches the first threshold value. If a negative decision is obtained in step 115, the control flow goes to step 125 to determine whether a period of time "TS" has elapsed or not. This step 125 is repeatedly executed until the integral value reaches the first threshold value. The opening stroke continues if the time period "TS" has not elapsed. The time period "TS" is set to be larger than the time it takes the integral value to reach the first threshold value when the received light increases with an increase in the lamp voltage (Vf). If the time "TS" expires before the integral value reaches the first threshold value, an automatic flash mode as described later is selected to fire the strobe.

If the integral value reaches the first threshold value, on the other hand, step 116 is executed to keep the lamp voltage Vf at a level that is 20% lower than the lamp voltage at the point of time "tb", as shown in FIG. 5B. As a result, the pulse width modulation circuit 40 finish driving the shutter blades 11, 12 in the opening stroke, and applies the maximum biasing force to the coil 13C in the closing direction so as to reverse the direction of movement of the shutter blade 11, 12. In step 116, the arithmetic unit 40 generates a reference voltage Vref that is 15% lower than the lamp voltage at the point of time "tb", which voltage Vref is applied through the D/A converter 59 to the comparator of the amplifier 42, in preparation for detection of the closing stroke.

In step 117, the output voltage Vp of the amplifier 43 is compared with the reference voltage Vref so as to detect completion of the shift to the closing stroke. If the output voltage Vp becomes lower than the reference voltage Vref, step 118 is executed to set the slope of the lamp voltage Vf in the closing stroke, depending upon the integral value (hatched portion) of the amount of light received up to the point of time "tc", as shown in FIG. 5C. If the integral value is too large, the closing stroke H2 with a large or steep slope is selected, and, if the integral value is too small, the closing stroke H1 with a small or gentle slope is selected.

Step 119 is then executed to start reducing the lamp voltage Vf with the selected slope. The pulse width modulation circuit 50 then increases or decreases the biasing force of the coil 13C so as to change the size of the opening of the secondary aperture in accordance with reduction of the lamp voltage Vf, so that the amount of the light received by the photoresponsive element 15 is gradually reduced.

In step 120, it is determined whether a period of time "TN" has elapsed from the time "ta" of the start of the exposure operation, and if the time period "TN" expires, the shutter blades 11, 12 are considered to return to the closed position, and the control flow goes to step 121. In step 121, the feedback control of the pulse width modulation circuit 50 is canceled (PWM-OFF), and the power supply to the coil 13C is stopped, so as to terminate one cycle of exposure control.

Figure 6A:
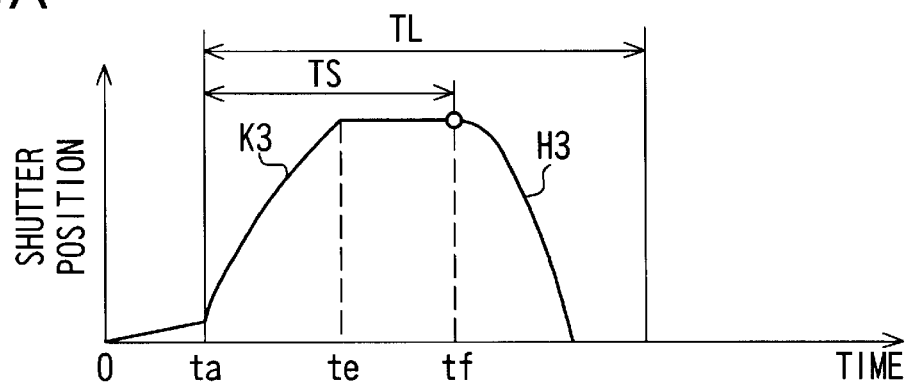
FIGS. 6A–6D are graphs and time chart for explaining exposure control at an insufficient level of ambient light.

If the ambient light is at a low level, the shutter blades 11, 12 reach the limit of their movement in the opening stroke K3 and stop at the point of time "te", as shown in FIG. 6A, and the amount of the received light does not increase after the point of time "te" since the size of the secondary aperture is held at the maximum. In this case, too, if the integral value reaches the first threshold value in step 115 before the period of time "TS" expires, the control of steps 116–120 is executed. If the lapse of the time period "TS" is detected in step 125 before the integral value reaches the first threshold value, however, the control flow goes to step 126 to automatically fire the strobe.

Figure 6B:
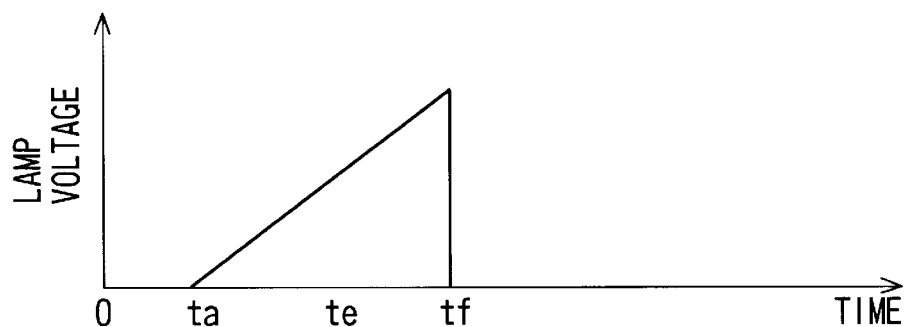

In step 126, the lamp voltage Vf is eliminated at the point of time "tf" as shown in FIG. 6B, and a trigger signal is generated to the strobe circuit 25. As a result, the pulse width modulation circuit 53 causes the coil 13C to generate the maximum biasing force in the closing direction, so as to shift the shutter blades 11, 12 to the closing stroke H3 to bring these blades 11, 12 into the closed position. Although it takes several milliseconds for the shutter blades 11, 12 to return to the initial closed position even at the maximum speed, the stroboscopic illumination is completed in a short period of time equal to or less than 1 millisecond. Accordingly, the strobe circuit 25 initiates discharging of the discharge tube 26 while the size of secondary aperture is kept at the maximum due to the inertia of the shutter blades 11, 12, so that the subject in front of the camera is illuminated by the strobe light.

Figure 6C:
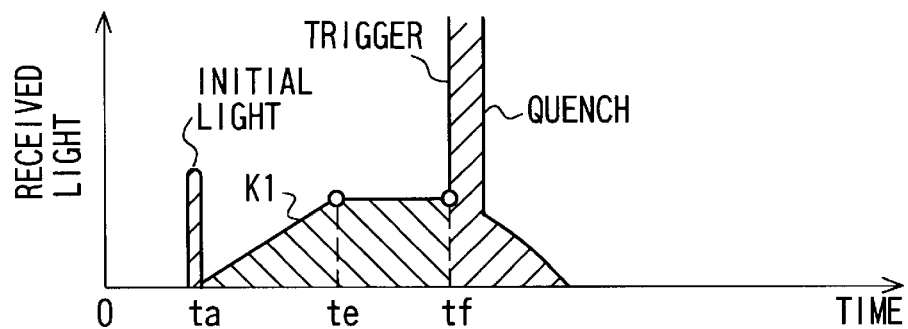
Figure 6D:
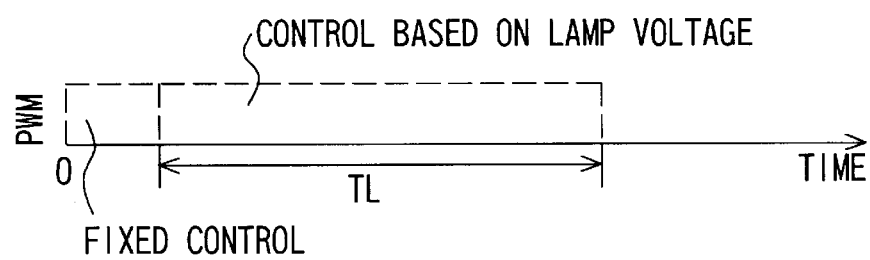

As a result, the amount of the received light is rapidly increased due to the reflected strobe light, with a slope that depends on the camera-to-subject distance, as shown in FIG. 6C. This results in a rapid increase in the output voltage of the integrating circuit consisting of the amplifier 47 and condenser 45. The output voltage reaches a threshold value Vq upon a lapse of time that depends upon the camera-to-subject distance, and then the output of the amplifier 46 is reversed so that the strobe circuit 25 receives a quench signal. The threshold value Vq is preliminarily determined by the arithmetic unit 40 and transmitted to the comparator of amplifier 46 through the D/A converting circuit 52.

Upon receipt of the quench signal, the strobe circuit 25 cuts off the current applied to the discharge tube 26 to force the discharge tube 26 to stop discharging, thereby to prevent the photosensitive film 16 from being excessively exposed by the strobe light. While the closing stroke H3 continues after the stroke light is quenched, step 127 is executed to determine whether the period of time "TL" has elapsed since detection of the initial light, and, if the time period "TL" expires, it is determined that the shutter blades 11, 12 have returned to the closed position. Then, the control flow goes to step 121, and one cycle of exposure control is completed.

In the camera apparatus of the present embodiment, the exposure amount through the primary aperture is controlled using the integral value of the light received through the secondary aperture, thereby canceling errors in a mechanical system of the camera and influences of the frictional force, under the feedback control using the integrated amount of the received light. Thus, even if the mechanical system operates with low repeatability, substantially the same exposure amount can be ensured with high repeatability, depending upon the accuracy of the circuit system.

Since the level of the ambient light is determined based on the integrated amount of the light received by the photoresponsive element 15, an exclusive photoresponsive element or circuit for measuring the level of the ambient light need not be provided, and the level of the ambient light need not be measured before the secondary aperture is opened. Accordingly, the exposure operation can be initiated immediately after the operation of the switch 27.

In the present camera apparatus, the pulse width modulation circuit 50 changes the amount of the light received by the photoresponsive element 15 in accordance with the lamp voltage Vf, and therefore the exposure time or duration does not vary so much even with different levels of the ambient light. Where the ambient light is at a high level, the shutter blades 11, 12 reciprocate at a low speed over a relatively small stroke up to the smaller extreme aperture value, and, where the ambient light is at a low level, the shutter blades 11, 12 reciprocate at a high speed over a relatively large stroke up to the larger extreme aperture value. Accordingly, the present camera apparatus does not suffer from blurring caused by shaking hands when the exposure duration is unexpectedly prolonged, nor suffer from increased errors occurring upon reversal of the shutter blades 11, 12 when the exposure duration is extremely reduced, which make it difficult to accurately control the exposure amount.

Since the arithmetic unit 40 serves to detect the integrated amount of the received light and performs control for reversing the shutter blades 11, 12, the timing of the reversal and the total exposure amount may be freely changed on its control programs. Thus, the function of controlling the exposure level to a desired level (so-called fractional control) can be added merely by adding a small number of electronic components to the arithmetic unit 40 or changing its control programs.

In the present camera apparatus, the movement of the shutter blades 11, 12 is controlled to follow changes in the lamp voltage Vf, and the pattern of increase and decrease of the lamp voltage Vf during the exposure time can be set or determined as desired on a program. Thus, the pattern of increase and decrease of the lamp voltage Vf can be easily established to assure high repeatability of the exposure amount, giving priority to photographing conditions and conveniences of the mechanical system.

Further, since one end of each of the openings 21, 22 that define the secondary aperture has a triangular shape, and the lamp voltage Vf is linearly increased in the opening stroke, the speed of the shutter blades 11, 12 is gradually reduced as the opening stroke progresses, thus reducing errors due to the inertia upon reversal of the shutter blades 11, 12, as compared with the case where the shutter blades 11, 12 are moved at a constant speed (when the amount of the received light increases along a quadratic curve).

Since the analog circuit performs the control of quenching the strobe light, so as to accurately control the amount of the stroboscopic illumination with high response, while the arithmetic unit (logic unit) 40 sets the threshold value Vq used for quenching the strobe light, the quantity of the stroboscopic illumination can be subtly controlled on an appropriate program, taking account of various conditions, such as the size of a main subject, camera-to-subject distance, illumination conditions (back light, normal light), and reflecting conditions.

Also, the speed of the shutter blades 11, 12 is controlled depending upon the integral value of the light received by the time when the shift to the closing stroke is detected. Therefore, even if an error is involved in the integral value upon reversal of the shutter blades 11, 12 due to a difference in the speed of the blades 11, 12 in the opening stroke, the error may be canceled by the end of the exposure time, and the total exposure amount can be precisely controlled. In other words, the exposure amount in both of the opening stroke and closing stroke is controlled, assuring increased repeatability of the exposure amount as compared with the case where only the exposure amount in the opening stroke is controlled, leaving the control in the closing stroke to the mechanical system.

While the shutter blades 11, 12 are reversed when the integral value reaches the first threshold value, these blades 11, 12 may be controlled to be reversed upon a lapse of a given time (10 milliseconds, for example) after detection of the initial light.

While the first threshold value employed in the present embodiment is determined so as to correspond to one half of the required exposure amount, driving of the coil 13 in the opening stroke may be finished when the integral value reaches one-third of the required exposure amount, and a given size of the exposure aperture may be maintained (or the size of the aperture may be slowly reduced). Then, the pattern of the lamp voltage may be selected depending upon the integral value of the light received by the time when fluctuations of the received light (deviation from the servo state due to the inertia) following the point of inflection of the lamp voltage are converged or eliminated.

While the pattern of the lamp voltage is adjusted according to the integral value only once in the closing stroke in the illustrated embodiment, the pattern of the lamp voltage may be adjusted according to the integral value once or a plurality of times more, after the control based on the initially adjusted pattern of the lamp voltage is started.

In the illustrated embodiment, the reference voltage Vref is set to be slightly higher than the lamp voltage Vf to be maintained after the integral value reaches the first threshold value, so that the lamp voltage Vf starts being reduced prior to control of the amount of the received light in accordance with the lamp voltage Vf. After the amount of the received light following the lamp voltage Vf is maintained at a given value (servo control is locked on), a pattern of the lamp voltage may be formed by a smooth curve containing no point where the curve is discontinuous or not differential, so that the shift to the closing stroke can be carried out without affecting the relationship (servo state) between the lamp voltage and the amount of the received light.

Although a point of inflection is formed in the pattern of the lamp voltage at the point of time when the integral value reaches the first threshold value in the illustrated embodiment, the lamp voltage may be raised along a curve, such as an arc or parabola, after detection of the initial light, so as to be smoothly shifted to the closing stroke without forming any point of inflection in the curve or any point where the curve is not continuous or not differential. Thus, after the shift to the closing stroke is carried out without affecting the relationship between the lamp voltage and the amount of the received light, the pattern of the lamp voltage after the start of the closing stroke may be controlled depending upon the integral value up to the point of time when the closing stroke is started.

In the illustrated embodiment, the pattern of the lamp voltage is in the form of a straight line after the closing stroke is started, and is controlled by adjusting the slope of the straight line. The lamp voltage pattern, however, may be in the form of a curve defined by a function of three variables, for example, which is determined depending upon the integral value.

Figure 7:
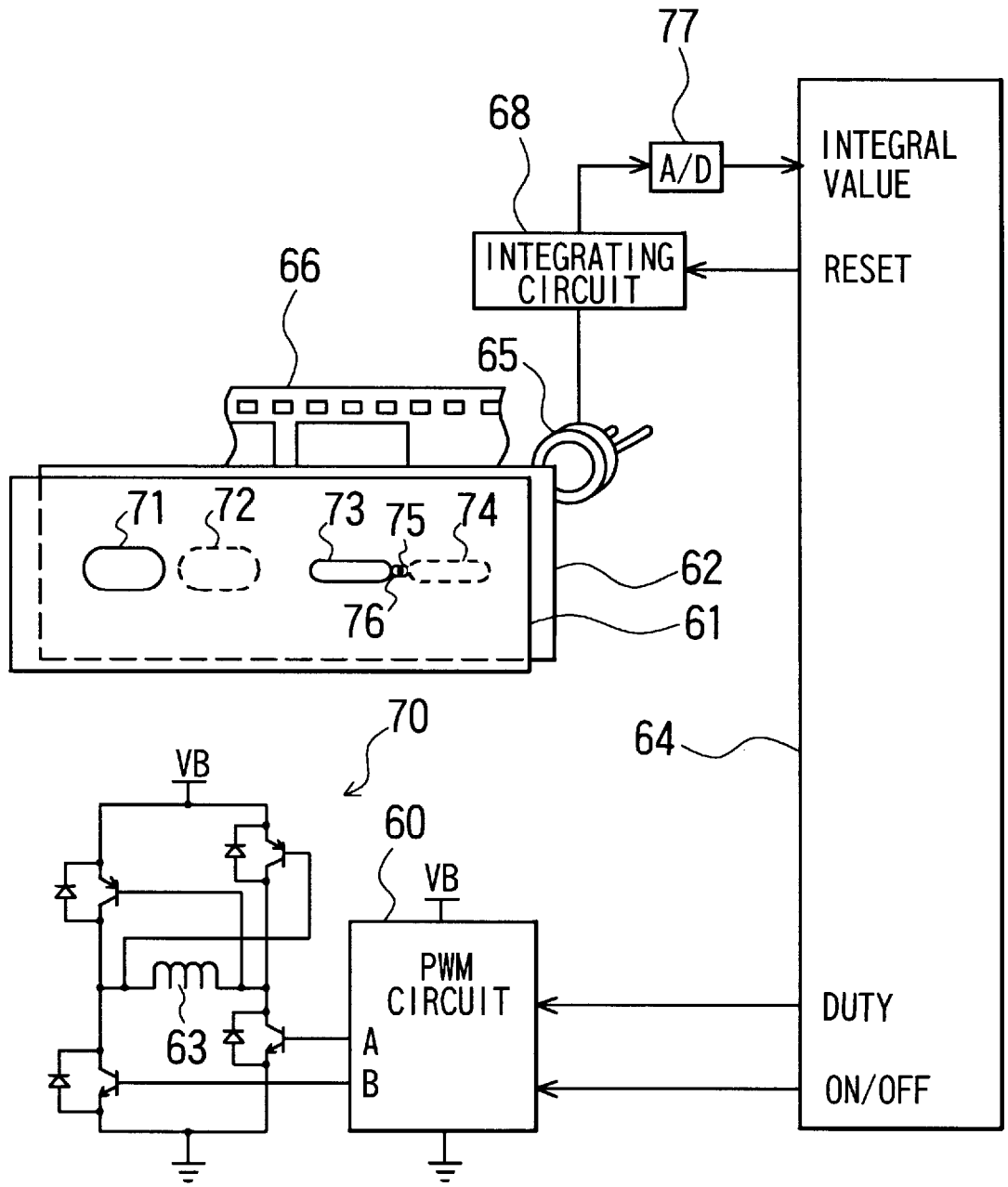
FIG. 7 is a view showing the construction of a camera apparatus of another embodiment of the present invention.
Figure 8A:
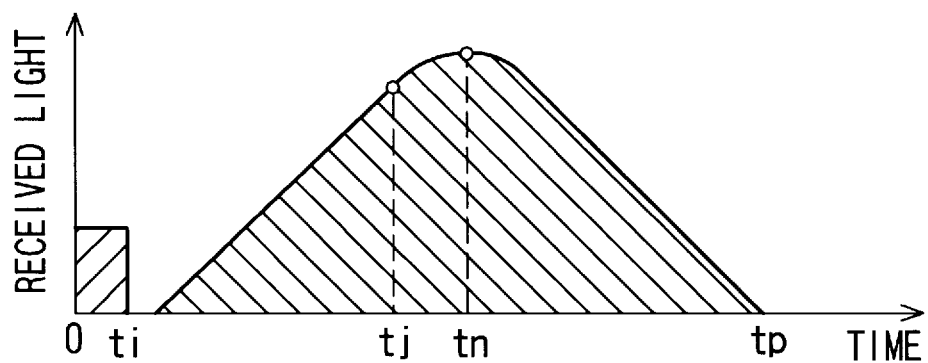
FIGS. 8A and 8B are graphs explaining output control in the camera apparatus of FIG. 7.
Figure 8B:
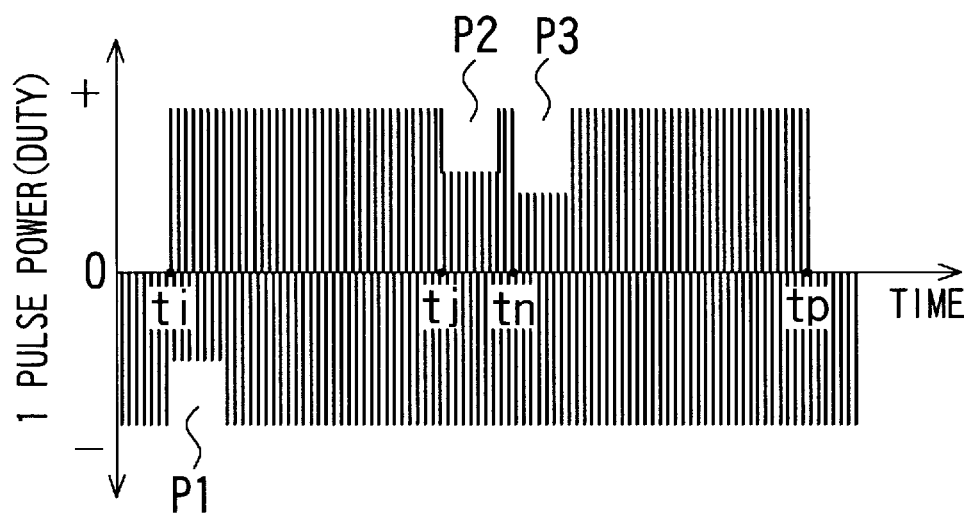

Referring to FIG. 7 through FIG. 8B, a camera apparatus according to another embodiment of the present invention will be described. FIG. 7 is a view showing the construction of the camera apparatus of the embodiment, and FIGS. 8A and 8B are graphs explaining the output control of the apparatus.

As shown in FIG. 7, a pair of shutter blades 61, 62 are driven by an electromagnetic actuator (not shown), to move relative to each other in the lateral direction in FIG. 7. The shutter blade 61 is formed with an opening 75 used for measuring external light, in addition to an opening 71 for defining a primary aperture and an opening 73 for defining a secondary aperture. The shutter blade 62 is formed with an opening 76 used for measuring the external light, in addition to an opening 72 for defining the primary aperture and an opening 74 for defining the secondary aperture.

While the shutter blades 61, 62 are placed in the stand-still state in which the primary and secondary apertures are completely closed, the external light, namely, light radiated from a scene including a subject, is incident upon a photoresponsive element 65, through an aperture or hole formed by the overlapping openings 75, 76 for measuring the external light.

Then, as the shutter blades 61, 62 move relative to each other, the openings 71, 72 overlap each other to form an exposure opening through which the photosensitive film 66 is exposed by the external light or scene light, and the openings 73, 74 overlap each other to form a detection opening through which the external light is incident upon the photoresponsive element 65.

The drive force for driving the shutter blades 61, 62 is set or determined as a difference between drive forces of positive and negative power pulses given to a coil 63C of the electromagnetic actuator (not shown). By use of a circuit arrangement similar to that of the embodiment of FIG. 1, the duty of one of the positive and negative power pulses is shortened.

Once the arithmetic unit 64 establishes the length of the pulse in the pulse width modulation circuit 60, the pulse width modulation circuit 60 alternately turns ON two pairs of transistors provided in a transistor drive portion 70. In this manner, positive and negative rectangular voltage pulses subjected to the duty control are applied to the coil 63C.

The graph of FIG. 8A shows changes in the amount of light received by the photoresponsive element 65 over the exposure time, and the graph of FIG. 8B shows changes in one pulse power during the exposure time. In this embodiment, the drive forces applied in the opposite directions are made equal to each other except the initial and terminal periods of the opening and closing strokes, and the feedback control of the drive force using the instantaneous amount of the received light as employed in the embodiment of FIG. 1 is not performed.

If a switch (shutter button) that is not illustrated is depressed, the shutter blades 61, 62 are kept driven in the closing direction until the point of time "ti" is reached, as shown in FIG. 8B, so that the shutter blade 61, 62 are kept in the stand-still state, with the external light incident upon the photoresponsive element 65 through the overlapping openings 75, 76, as shown in FIG. 8A.

The arithmetic unit 64 measures the level of the external light so as to determine the drive force in the opening stroke. Initially, the arithmetic unit 64 resets the integrating circuit 68 to cause the circuit 68 to integrate the measured external light over a fixed time period, and retrieves the result of the integration through the A/D converting circuit 77, so as to select an appropriate length of the power pulse from a memory (not shown), in accordance with the integral value. If the external light is at a high level, the acceleration is reduced to establish a low shutter speed. If the external light is at a low level, the acceleration is increased to establish a high shutter speed.

As shown in FIG. 8B, the acceleration P1 of the shutter blades 61, 62 is started at the point of time "ti", and the deceleration P2 of these blades is started at a point of time "tj" when a given time elapses from the time "ti". Since the same pulse power (corresponding to the duty of the voltage pulse) and the same time period during which the pulse is given are employed for the acceleration P1 and deceleration P2, the shutter blades 61, 62 come to a stop after experiencing the deceleration P2.

The arithmetic unit 64 resets an integrating circuit 77 at the point of time "ti" to cause the circuit 77 to start integrating the amount of the received light in the opening stroke, and reads the integral value through an A/D converting circuit at the time of completion of the deceleration P2, so as to set or determine the acceleration P3 in the closing stroke, depending upon the level of the external light and the integrated amount of the received light, and immediately drive the shutter blades 61, 62 with the acceleration P3.

More specifically, on the basis of one pulse power and duration equal to those of the acceleration P1, the degree of reduction of one pulse power is increased so as to increase the closing speed of the shutter blades 61, 62 if the integrated amount of the received light is excessively large compared to an anticipated amount corresponding to one half of the required total exposure amount. If the integrated amount of the received light is excessively small, on the other hand, the degree of reduction of one pulse power is reduced so as to reduce the closing speed of the shutter blades 61, 62.

In this manner, almost one half of the required exposure amount is achieved by the time of completion of the deceleration P2, and the rest of the exposure amount is achieved by the point of time "tp" when the shutter blades 61, 62 return to the original stand-still state after experiencing the acceleration P3 in the closing stroke.

In the camera apparatus of the present embodiment, the pulse length is selected depending upon the integral value at the point of time "ti", so that the maximum size or area of the primary aperture during the exposure time is set depending upon the level of the external light. Thus, the exposure time can be controlled to an almost constant value even with difference levels of the external light, thus reducing unexpected blurring by shaking hands or excessive exposure. Further, since the excessive or insufficient amount of the received light in the opening stroke is corrected in the closing stroke, by selecting the pulse length depending upon the integral value obtained at the point of time "tj", an error in the exposure amount in each exposure operation may be reduced. Also, the shutter is operated by repeating positive and negative driving, and therefore differences in the friction and the drive force may be reduced in each exposure operation.

In the illustrated embodiment, the acceleration is carried out only in the beginning of the opening stroke and closing stroke, and one pulse power is controlled to a fixed value in the other periods. However, the acceleration may be continued by setting a difference in one pulse power for an extended period of time. In the closing stroke, the levels of one pulse power in the positive and negative directions may be reduced in an attempt to save power.

According to the present invention, the drive condition of the shutter mechanism is controlled by feeding back the amount of light received by the photoresponsive element. Therefore, the same opening stroke and closing stroke of the shutter mechanism can be repeated with high accuracy in each exposure operation, even if the shutter mechanism and drive mechanism operate with low accuracy and the same operation cannot be repeated with respect to the same input due to variations in the friction and drive force. Accordingly, inexpensive components may be used for the shutter mechanism and drive mechanism, to provide a highly efficient camera apparatus.

Since the amount of the light received by the photoresponsive element is changed according to a given function in almost the same fashion for each exposure, the shutter mechanism and drive mechanism can perform stable operations, and the exposure amount of the photosensitive film in each exposure is stabilized.

What is claimed is:

1. A shutter apparatus comprising:

a shutter mechanism having a primary aperture that defines an exposure opening through which light is incident upon a photosensitive film, and a secondary aperture that defines a detection opening through which the light is incident upon a photoresponsive element, said primary aperture and said secondary aperture having opening sizes which vary in association with each other;

drive means for driving said shutter mechanism to form an opening stroke in which the size of said exposure opening is increased, and a closing stroke in which the size of the exposure opening is reduced, so as to establish an exposure time in which said photosensitive film is exposed to the light;

control means for changing an output condition of said drive means in accordance with an output of said photoresponsive element, wherein said control means detects an electric signal corresponding to an instantaneous amount of light received by said photoresponsive element, at least once during the exposure time, so as to control the output condition of the drive means according to the detected electric signal, so that the instantaneous amount of light received by said photoresponsive element is changed along a curve corresponding to a predetermined function, and wherein said control means generates a reference signal of an analog voltage that momentarily changes in accordance with said predetermined function, over at least a portion of said exposure time, compares a voltage signal corresponding to the instantaneous amount of light received by said photoresponsive element, with said reference signal, and continuously adjust the output condition of said drive means so that said voltage signal coincides with said reference signal.

2. A shutter apparatus comprising:

a shutter mechanism having a primary aperture that defines an exposure opening through which light is incident upon a photosensitive film, and a secondary aperture that defines a detection opening through which the light is incident upon a photoresponsive element, said primary aperture and said secondary aperture having opening sizes that vary in association with each other;

drive means for driving said shutter mechanism to form an opening stroke in which the size of said exposure opening is increased, and a closing stroke in which the size of the exposure opening is reduced, so as to establish an exposure time in which said photosensitive film is exposed to the light;

control means for changing an output condition of said drive means in accordance with a result of integration of an electric signal corresponding to an instantaneous amount of light received by said photoresponsive element, wherein said control means integrates said electric signal obtained in a period of time including at least a part of said opening stroke, and controls the output condition of said drive means according to the result of integration of said electric signal, at least once during said closing stroke, so that a total amount of light received by said photoresponsive element over the exposure time is controlled to a predetermined value, and wherein said control means generates a reference signal of an analog voltage whose level is gradually reduced according to a given function selected depending upon the result of integration of said electric signal, compares a voltage signal corresponding to the instantaneous amount of light received by said photoresponsive element, with said reference signal, and continuously adjusts the output condition of said drive means so that said voltage signal coincides with said reference signal.

3. A shutter apparatus according to claim 2, further comprising:

ambient light measuring means for detecting an ambient light of a scene and measuring an intensity of the ambient light, prior to the start of the exposure time or at an initial stage of the exposure time, and wherein said control means establishes the output condition of said drive means in said opening stroke, depending upon an output of said ambient light measuring means, and adjusts the output condition of said drive means after the opening stroke, depending upon the result of integration of said electric signal up to a given point of time during the exposure time.

4. A shutter apparatus according to claim 1, 2 or 3, wherein said control means supplies said drive means with a continuous power pulse that is alternately reversed in positive and negative directions, while changing the ratio of positive and negative power of the power pulse so as to control an output level of the drive means.

5. A shutter apparatus comprising:

a shutter mechanism having a primary aperture that defines an exposure opening through which light is incident upon a photosensitive film, and a secondary aperture that defines a detection opening through which the light is incident upon a photoresponsive element, said primary aperture and said secondary aperture having opening sizes which vary in association with each other;

drive means for driving said shutter mechanism to form an opening stroke in which the size of said exposure opening is increased, and a closing stroke in which the size of the exposure opening is reduced, so as to establish an exposure time in which said photosensitive film is exposed to the light;

control means for changing an output condition of said drive means in accordance with an output of said photoresponsive element, wherein said control means detects an electric signal corresponding to an instantaneous amount of light received by said photoresponsive element, at least once during the exposure time, so as to control the output condition of the drive means according to the detected electric signal, so that the instantaneous amount of light received by said photoresponsive element is changed along a curve corresponding to a predetermined function, wherein said control means supplies said drive means with a continuous power pulse that is alternately reversed in positive and negative directions, while changing the ratio of positive and negative power of the power pulse so as to control an output level of the drive means, and wherein said control means generates a control signal in the form of a chopping wave whose amplitude is reduced over the maximum length of the power pulse, and a reference signal that is determined so as to correspond to a basic change of the instantaneous amount of light received by said photoresponsive element through the exposure time, wherein said control means sets a trigger level of said control signal according to a difference between the electric signal corresponding to the instantaneous amount of light received by said photoresponsive element, and said reference signal, and wherein said control means generates said power pulse that corresponds to a length of a portion by which a pulse of said control signal exceeds said trigger level.

6. A camera apparatus having a strobe unit which starts discharging of a strobe discharge tube in response to a fire signal, and interrupts discharging in response to a quench signal, comprising:

the shutter apparatus as defined in claim 1, and strobe control means that integrates an electric signal corresponding to an instantaneous amount of light received by said photoresponsive element, and generates the fire signal so as to automatically start artificial illumination by use of the strobe discharge tube if an integral value of the electric signal does not reach the first threshold value by the time when a predetermined time elapses after an exposure operation is started.

7. A camera apparatus according to claim 6, wherein said strobe control means generates the quench signal to automatically stop firing of the strobe unit when said integral value reaches a second threshold value that is set to be larger than said first threshold value.

8. A shutter apparatus according to claim 2, wherein said control means supplies said drive means with a continuous power pulse that is alternately reversed in positive and negative directions, while changing the ratio of positive and negative power of the power pulse so as to control an output level of the drive means.

9. A shutter apparatus according to claim 3, wherein said control means supplies said drive means with a continuous power pulse that is alternately reversed in positive and negative directions, while changing the ratio of positive and negative power of the power pulse so as to control an output level of the drive means.

10. A shutter apparatus comprising:

a shutter mechanism having a primary aperture that defines an exposure opening through which light is incident upon a photosensitive film, and a secondary aperture that defines a detection opening through which the light is incident upon a photoresponsive element, said primary aperture and said secondary aperture having opening sizes that vary in association with each other;

drive means for driving said shutter mechanism to form an opening stroke in which the size of said exposure opening is increased, and a closing stroke in which the size of the exposure opening is reduced, so as to establish an exposure time in which said photosensitive film is exposed to the light;

control means for changing an output condition of said drive means in accordance with a result of integration of an electric signal corresponding to an instantaneous amount of light received by said photoresponsive element, wherein said control means integrates said electric signal obtained in a period of time including at least a part of said opening stroke, and controls the output condition of said drive means according to the result of integration of said electric signal, at least once during said closing stroke, so that a total amount of light received by said photoresponsive element over the exposure time is controlled to a predetermined value, wherein said control means supplies said drive means with a continuous power pulse that is alternately reversed in positive and negative directions, while changing the ratio of positive and negative power of the power pulse so as to control an output level of the drive means, wherein said control means generates a control signal in the form of a chopping wave whose amplitude is reduced over the maximum length of the power pulse, and a reference signal that is determined so as to correspond to a basic change of the instantaneous amount of light received by said photoresponsive element through the exposure time, wherein said control means sets a trigger level of said control signal according to a difference between the electric signal corresponding to the instantaneous amount of light received by said photoresponsive element, and said reference signal, and wherein said control means generates said power pulse that corresponds to a length of a portion by which a pulse of said control signal exceeds said trigger level.

11. A shutter apparatus according to claim 10, further comprising:

ambient light measuring means for detecting an ambient light of a scene and measuring an intensity of the ambient light, prior to the start of the exposure time or at an initial stage of the exposure time, and wherein said control means establishes the output condition of said drive means in said opening stroke, depending upon an output of said ambient light measuring means, and adjusts the output condition of said drive means after the opening stroke, depending upon the result of integration of said electric signal up to a given point of time during the exposure time.

* * * * *